(12) United States Patent
Koyama et al.

(10) Patent No.: US 9,243,680 B2
(45) Date of Patent: Jan. 26, 2016

(54) FLUID-FILLED TYPE ACTIVE VIBRATION DAMPING DEVICE

(75) Inventors: Hironori Koyama, Kasugai (JP); Mutsumi Muraoka, Nagakute (JP)

(73) Assignee: SUMITOMO RIKO COMPANY LIMITED, Aichi (JP)

( * ) Notice: Subject to any disclaimer, the term of this patent is extended or adjusted under 35 U.S.C. 154(b) by 49 days.

(21) Appl. No.: 13/414,866

(22) Filed: Mar. 8, 2012

(65) Prior Publication Data

US 2012/0242019 A1 Sep. 27, 2012

(30) Foreign Application Priority Data

Mar. 25, 2011 (JP) ................. 2011-067093

(51) Int. Cl.
| | | |
|---|---|---|
| *F16F 13/28* | (2006.01) | |
| *F16F 13/16* | (2006.01) | |
| *F16F 13/26* | (2006.01) | |
| *F16F 13/10* | (2006.01) | |

(52) U.S. Cl.
CPC ............ *F16F 13/268* (2013.01); *F16F 13/105* (2013.01)

(58) Field of Classification Search
CPC ........... F16F 13/08; F16F 13/10; F16F 13/26; F16F 13/30; F16F 13/105; F16F 13/106; F16F 13/262; F16F 13/264; F16F 13/268
USPC ....................................... 267/140.13, 140.14
See application file for complete search history.

(56) References Cited

U.S. PATENT DOCUMENTS

| | | | | |
|---|---|---|---|---|
| 5,209,460 A | * | 5/1993 | Bouhours | F16F 13/262 267/140.13 |
| 6,422,546 B1 | * | 7/2002 | Nemoto | F16F 13/26 267/140.13 |
| 2001/0032919 A1 | * | 10/2001 | Hagino | F16F 13/264 248/562 |
| 2002/0053764 A1 | * | 5/2002 | Goto | F16F 13/264 267/140.14 |
| 2002/0109280 A1 | * | 8/2002 | Baudendistel | F16F 13/106 267/140.15 |
| 2004/0145098 A1 | * | 7/2004 | Thaler | A62B 35/04 267/33 |
| 2005/0206056 A1 | * | 9/2005 | Maeno | F16F 13/106 267/140.13 |
| 2007/0138718 A1 | * | 6/2007 | Muraoka | F16F 13/105 267/140.14 |
| 2008/0036242 A1 | * | 2/2008 | Glance | B60R 13/0225 296/187.09 |

(Continued)

FOREIGN PATENT DOCUMENTS

| | | |
|---|---|---|
| JP | 2009-092235 | 4/2009 |
| JP | 2009-162281 | 7/2009 |
| JP | 2009-162282 | 7/2009 |
| JP | 2010-048350 | 3/2010 |

*Primary Examiner* — Anna Momper
*Assistant Examiner* — San Aung
(74) *Attorney, Agent, or Firm* — Greenblum & Bernstein, P.L.C.

(57) ABSTRACT

A fluid-filled type active vibration damping device including: a pressure-receiving chamber; an equilibrium chamber; an orifice passage permitting fluid flow between the two chambers; an oscillation member oscillated by an electromagnetic actuator; an intermediate chamber; and a pressure transmission passage through which pressure fluctuations produced in the intermediate chamber is applied to the pressure-receiving chamber. The intermediate chamber is provided independently of the equilibrium chamber. The pressure transmission passage comprises a filter orifice tuned to higher frequency than the orifice passage. A movable plate is provided for limiting an amount of fluid flow through the filter orifice. A leak hole is formed for continuously interconnecting the intermediate chamber and the pressure-receiving chamber, and a liquid column resonance frequency of the leak hole is set to not more than half of that of the filter orifice.

11 Claims, 4 Drawing Sheets

(56) References Cited

U.S. PATENT DOCUMENTS

2009/0079114 A1* 3/2009 Muraoka .................. F16F 13/26
                                                        267/121
2010/0072683 A1* 3/2010 Saito ..................... F16F 13/106
                                                        267/140.13
2010/0148413 A1* 6/2010 Lee ....................... F16F 13/262
                                                        267/140.11

* cited by examiner

WITHOUT A LEAK HOLE

WITH A LEAK HOLE

FLUID-FILLED TYPE ACTIVE VIBRATION DAMPING DEVICE

INCORPORATED BY REFERENCE

The disclosure of Japanese Patent Application No. 2011-067093 filed on Mar. 25, 2011 including the specification, drawings and abstract is incorporated herein by reference in its entirety.

BACKGROUND OF THE INVENTION

1. Field of the Invention

The present invention relates generally to a fluid-filled type vibration damping device that utilizes vibration damping effect on the basis of the flow action of the fluid filling the interior. More particularly, the present invention pertains to a fluid-filled type active vibration damping device capable of exhibiting active vibration damping effect by exerting the oscillation force generated by an electromagnetic actuator on an intermediate chamber.

2. Description of the Related Art

Conventionally, there is known a vibration damping device including: a first mounting member attached to one component of the vibration transmission system; a second mounting member attached to the other component of the vibration transmission system; and a main rubber elastic body elastically connecting the first and second mounting members. Such a vibration damping device is applied to an automotive engine mount or the like, for example. There is also known a fluid-filled type vibration damping device further including: a pressure-receiving chamber whose wall is partially defined by the main rubber elastic body; an equilibrium chamber whose wall is partially defined by a flexible film; and an orifice passage interconnecting the pressure-receiving chamber and the equilibrium chamber in order to attain vibration damping effect utilizing flow action of the fluid sealed therein. Additionally, there has been proposed a fluid-filled type active vibration damping device further incorporating an intermediate chamber whose wall is partially defined by an oscillation member oscillated by an electromagnetic actuator, and is capable of exhibiting active vibration damping effect by exerting pressure fluctuations within the intermediate chamber on the pressure-receiving chamber through a pressure transmission passage. Such a device is disclosed in Japanese Unexamined Patent Publication No. JP-A-2009-162281.

It has been attempted on the fluid-filled type active vibration damping device as to providing another orifice passage in addition to the orifice passage connecting the pressure-receiving chamber and the equilibrium chamber, with the aim of achieving vibration damping effect against vibrations in multiple frequency ranges. For example, the aforementioned Japanese Unexamined Patent Publication No. JP-A-2009-162281 discloses a structure in which a second orifice passage is provided for connecting the intermediate chamber and the equilibrium chamber, in addition to the orifice passage connecting the pressure-receiving chamber and the equilibrium chamber.

However, further research conducted by the inventors has shown that, in some instances, the second orifice passage connected to the intermediate chamber may appreciably deteriorate the active vibration damping effect based on pressure control of the intermediate chamber by the oscillation member.

This problem is likely to occur with map control rather than feedback control when employed as control means of the electromagnetic actuator. Accordingly, the inventors supposed that this problem was caused by such an instance that the pressure control was not able to follow the sharp change in spring characteristics due to resonance action of the second orifice passage. Therefore, the inventors addressed removal of the second orifice passage connecting the intermediate chamber and the equilibrium chamber.

However, it has led to the discovery that mere removal of the second orifice passage will not sufficiently improve the vibration damping characteristics, and poses an inherent problem of difficulty in obtaining the sufficient active vibration damping effect based on pressure control of the intermediate chamber by the oscillation member.

SUMMARY OF THE INVENTION

It is therefore one object of the present invention to provide a fluid-filled type active vibration damping device of novel construction which is able to stably exhibit active vibration damping effect based on pressure control of the intermediate chamber.

The inventors confirmed through tests that deterioration of the vibration damping ability caused by such an instance that the pressure control was not able to follow the sharp change in spring characteristics due to resonance action of the second orifice passage was eliminated by removal of the second orifice passage. However, the inventors also confirmed that vibration damping characteristics has not sufficiently improved yet. Consequently, the inventors contemplated that a new problem occurred in association with removal of the second orifice passage.

In order to specify the new problem which occurs in association with removal of the second orifice passage, the inventors have performed many tests and conducted researches. As a result, the inventors demonstrated that the new problem was caused by the structure of the pressure transmission passage provided for transmitting the oscillation force of the electromagnetic actuator (namely, pressure fluctuations) from the intermediate chamber to the pressure-receiving chamber.

Specifically, in some cases, the fluid-filled type active vibration damping device includes a pressure transmission passage in the form of a filter orifice in order to avoid exacerbated vibration due to high order components of the oscillation force generated by the electromagnetic actuator or the like. The filter orifice has lower flow resistance than that of the orifice passage with the aim of efficient transmission of the oscillation force or the like. Accordingly, a movable plate may concomitantly be employed for limiting fluid flow through the filter orifice in order to effectively obtain vibration damping effect by means of the orifice passage. The fluid-filled type active vibration damping device has thereby a structure in which the filter orifice and the movable plate are employed in combination. The inventors has discovered that when the second orifice passage is removed from such a device and the intermediate chamber and the equilibrium chamber are provided independently of each other, the new problem occurs and makes it difficult to sufficiently improve the vibration damping ability in some instances.

One possible explanation as to why the above-mentioned new problem occurs is discussed below. That is, let us assume a fluid-filled type active vibration damping device having a pressure transmission passage of the above-described structure, and a case where the second orifice passage is removed from such a device so that the intermediate chamber is independent of the equilibrium chamber. When the movable plate is pressed against the partition member due to a differential in fluid pressure arising between the intermediate chamber and the pressure-receiving chamber, the filter orifice is blocked by the movable plate and the intermediate chamber becomes sealed off. As a result, the fluid pressure of the intermediate chamber will be less likely to change and the movable plate pressed against the partition member will be kept locked. Consequently, the oscillation force of the electromagnetic actuator will not effectively be exerted on the pressure-receiving chamber, thereby failing to sufficiently exhibit active vibration damping effect based on the pressure control.

Therefore, the inventors were able to complete this invention based on the knowledge described above, in order to further enhance the ability of the fluid-filled type active vibration damping device. Specifically, a first mode of the present invention provides a fluid-filled type active vibration damping device including: a first mounting member; a second mounting member; a main rubber elastic body connecting the first mounting member and the second mounting member; a pressure-receiving chamber whose wall is partially defined by the main rubber elastic body and filled with a non-compressible fluid; an equilibrium chamber whose wall is partially defined by a flexible film and filled with the non-compressible fluid; an orifice passage permitting fluid flow of the non-compressible fluid between the pressure-receiving chamber and the equilibrium chamber; an oscillation member adapted to be oscillated by an electromagnetic actuator; an intermediate chamber whose wall is partially defined by the oscillation member and filled with the non-compressible fluid; a pressure transmission passage through which pressure fluctuations produced in the intermediate chamber is adapted to be applied to the pressure-receiving chamber, wherein the intermediate chamber is provided independently of the equilibrium chamber; wherein the pressure transmission passage comprises a filter orifice tuned to higher frequency than the orifice passage; wherein a movable plate is provided for limiting an amount of fluid flow through the filter orifice; and wherein a leak hole is formed for continuously interconnecting the intermediate chamber and the pressure-receiving chamber, and a liquid column resonance frequency of the leak hole is set to not more than half of that of the filter orifice.

With the fluid-filled type active vibration damping device according to the first mode of the present invention, the pressure-receiving chamber and the intermediate chamber are continuously interconnected via the leak hole. Accordingly, even when the filter orifice is blocked by the movable plate, fluid flow through the leak hole will dispel the differential in fluid pressure between the pressure-receiving chamber and the intermediate chamber, so that the filter orifice sealed off by the movable plate will be released. Thus, even if the intermediate chamber and the equilibrium chamber are provided independently of each other, active vibration damping effect based on the oscillation force of the electromagnetic actuator will effectively be exhibited, thereby preventing deterioration of vibration damping ability of the device.

Moreover, with the ratio of the cross-sectional area (A) and the length (L) of the leak hole being adjusted, the liquid column resonance frequency of the leak hole is set to not more than half of that of the filter orifice. With this arrangement, fluid flow through the leak hole will be sufficiently limited in comparison with fluid flow through the filter orifice, thereby ensuring ample fluid flow through the orifice passage. As a result, adverse effect on the vibration damping effect of the orifice passage caused by providing the leak hole can be minimized, thereby attaining effective vibration damping effect.

A second mode of the present invention provides the fluid-filled type active vibration damping device according to the first mode wherein the liquid column resonance frequency of the leak hole is set to at least 1/10 but not more than 2/5 of that of the filter orifice.

According to the second mode, since the liquid column resonance frequency of the leak hole is set to at least 1/10 of that of the filter orifice, the leak hole has a simple shape and a size which is easy to create. Besides, the liquid column resonance frequency of the leak hole is set to not more than 2/5 of that of the filter orifice. Therefore, the leak hole has sufficiently high flow resistance, whereby the orifice passage will exhibit more effective vibration damping effect.

According to the present invention, the leak hole for interconnecting the pressure-receiving chamber and the intermediate chamber is provided without being blocked by the movable plate. With this arrangement, even when relative pressure differential arises between the pressure-receiving chamber and the intermediate chamber and the movable plate becomes locked while blocking the filter orifice, fluid flow through the leak hole will be produced between the pressure-receiving chamber and the intermediate chamber. Thus, pressure differential between the pressure-receiving chamber and the intermediate chamber can be dispelled. As a result, active oscillation force will effectively be transmitted from the intermediate chamber to the pressure-receiving chamber, effectively achieving desired vibration damping effect. Moreover, the liquid column resonance frequency of the leak hole is set to not more than half of liquid column resonance frequency (tuning frequency) of the filter orifice. Accordingly, when vibration which corresponds to the liquid column resonance frequency (tuning frequency) of the orifice passage is input, fluid flow through the leak hole will be limited. Therefore, ample fluid flow through the orifice passage can be ensured, thereby sufficiently exhibiting vibration damping effect by means of the orifice passage.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein:

FIG. 6A demonstrates actual measurements of Comparative Example without a leak hole, and FIG. 6B demonstrates actual measurements of Example with a leak hole.

DETAILED DESCRIPTION OF PREFERRED EMBODIMENTS

Figure 1:
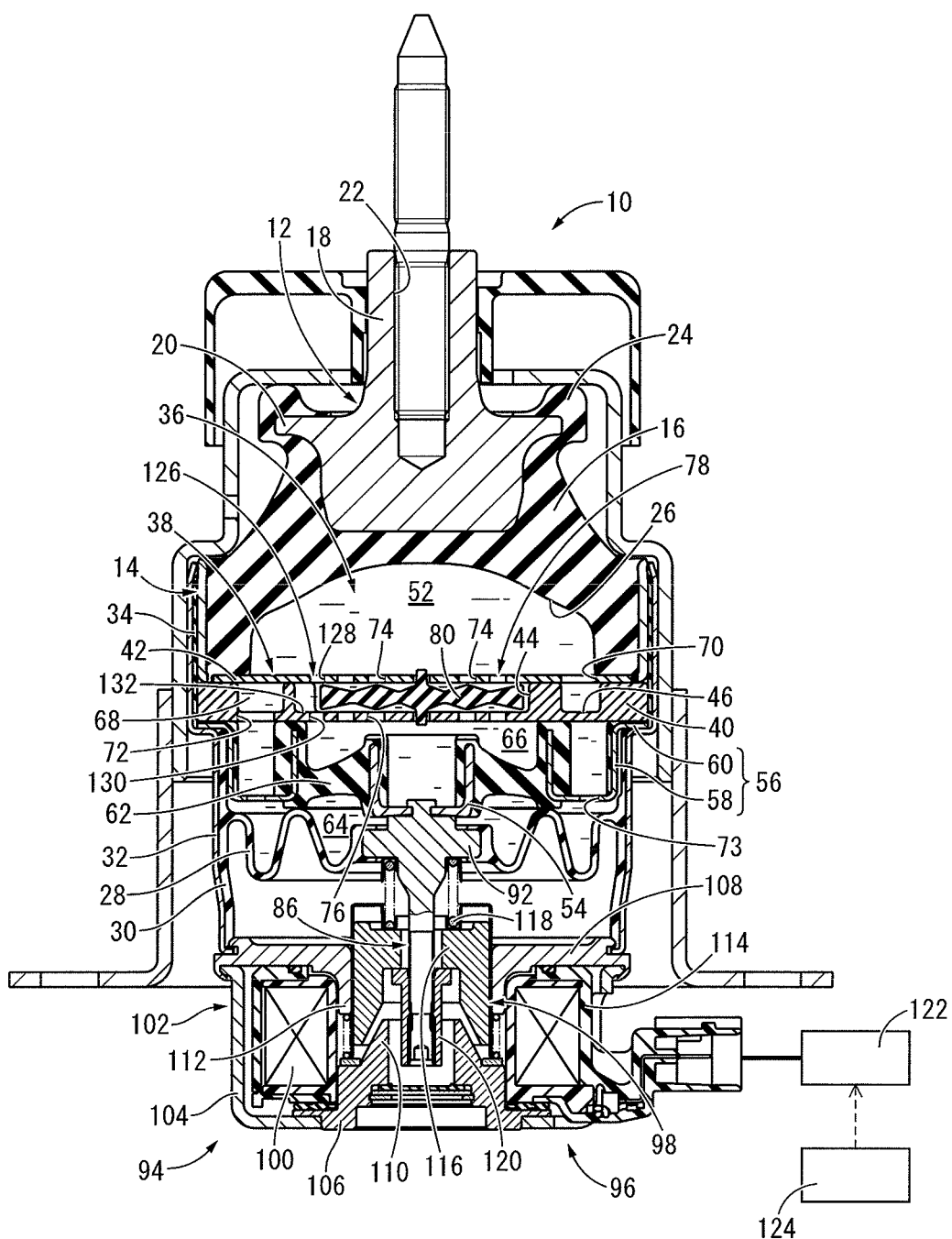
FIG. 1 is an elevational view in axial or vertical cross section of a fluid-filled type active vibration damping device in the form of an engine mount, which is constructed according to a first embodiment of the present invention.

Referring first to FIG. 1, there is depicted an automotive engine mount 10 according to a first embodiment of a fluid-filled type active vibration damping device constructed in accordance with the present invention. The engine mount 10 has a construction in which a first mounting member 12 and a second mounting member 14 are elastically connected by a main rubber elastic body 16. By the first mounting member 12 being attached to a power unit (not shown) and the second mounting member 14 being attached to a vehicle body (not shown), the engine mount 10 provides vibration damping linkage of the power unit on the vehicle body. In the description hereinbelow, as a general rule, the vertical direction refers to the vertical direction in FIG. 1.

Described more specifically, first mounting member 12 is a high rigidity component made of a metallic material or the like, and is integrally equipped with a main portion 18 and a flange portion 20. The main portion 18 is of generally stepped circular post shape whose upper part has a smaller diameter, and a flange portion 20 projects peripherally outward from the stepped portion of the main portion 18. In addition, the main portion 18 includes a screw hole 22 that opens onto its upper face and extends along the center axis. A screw thread is provided on the inside peripheral face of the screw hole 22.

Meanwhile, the second mounting member 14 is of thin-walled, large-diameter, generally round tubular shape, and is a high rigidity component made of a metallic material or the like similar to the first mounting member 12.

The first mounting member 12 and the second mounting member 14 are arranged in a concentric fashion, spaced apart in the diametrical and axial direction, and elastically interconnected by the main rubber elastic body 16. The main rubber elastic body 16 is of thick-walled, large-diameter, generally frustoconical shape. To the small-diameter end part of the main rubber elastic body 16 the main portion 18 of the first mounting member 12 is bonded by vulcanization, while to the outer circumferential face of the large-diameter end part of the main rubber elastic body 16 the inner circumferential face of the second mounting member 14 is juxtaposed and bonded by vulcanization.

A stopper rubber 24 is integrally formed with the main rubber elastic body 16. The stopper rubber 24 extends from the small-diameter end part of the main rubber elastic body 16 and is bonded so as to cover the outer circumferential face and the upper face of the flange portion 20 of the first mounting member 12. Accordingly, the stopper rubber 24 projects upward from the upper face of the flange portion 20.

A center recess 26 opens onto the large-diameter end part of the main rubber elastic body 16. The center recess 26 has an inverted, generally bowl shape or a generally cylindrical shape that opens downward.

A flexible film 28 is attached to the second mounting member 14. The flexible film 28 is a rubber film having a thin, generally disk shape or generally dome shape with an ample slack in the vertical direction. In addition, the flexible film 28 includes an anchor portion 30 of generally cylindrical shape integrally formed at its outer peripheral edge. The anchor portion 30 is bonded by vulcanization to a fastener fitting 32. The fastener fitting 32 has a stepped, generally round tubular shape, and to the inner circumferential face of its small-diameter portion situated at the lower side the anchor portion 30 is bonded by vulcanization. On the other hand, the large-diameter portion of the fastener fitting 32 situated at the upper side is externally fitted onto the second mounting member 14 and then subjected to a diameter-constricting process, thereby being mated around the second mounting member 14. In this way, the fastener fitting 32 is externally fastened onto the second mounting member 14. With this arrangement, the flexible film 28 is attached to the second mounting member 14 and the lower opening of the second mounting member 14 is closed off by the flexible film 28. Note that the inner circumferential face of the large-diameter portion of the fastener fitting 32 is covered by a seal rubber layer 34 formed of a thin-walled rubber elastic body, so that the second mounting member 14 and the fastener fitting 32 are fluid-tightly attached to each other via the seal rubber layer 34.

With the flexible film 28 attached to the second mounting member 14 in this way, a fluid-filled zone 36 sealed off from the outside is formed between opposed faces of the main rubber elastic body 16 and the flexible film 28, and is filled with a non-compressible fluid. While no particular limitation is imposed as to the non-compressible fluid filling the fluid-filled zone 36, preferred examples are water, alkylene glycols, polyalkylene glycols, silicone oil, and mixtures of these. In terms of efficiently achieving vibration damping action based on flow action of the fluid described later, a low-viscosity fluid having viscosity of 0.1 Pa·s or lower is especially preferred. In the present embodiment, a glycol-based mixture is filled as the non-compressible fluid within the fluid-filled zone 36.

Figure 2:
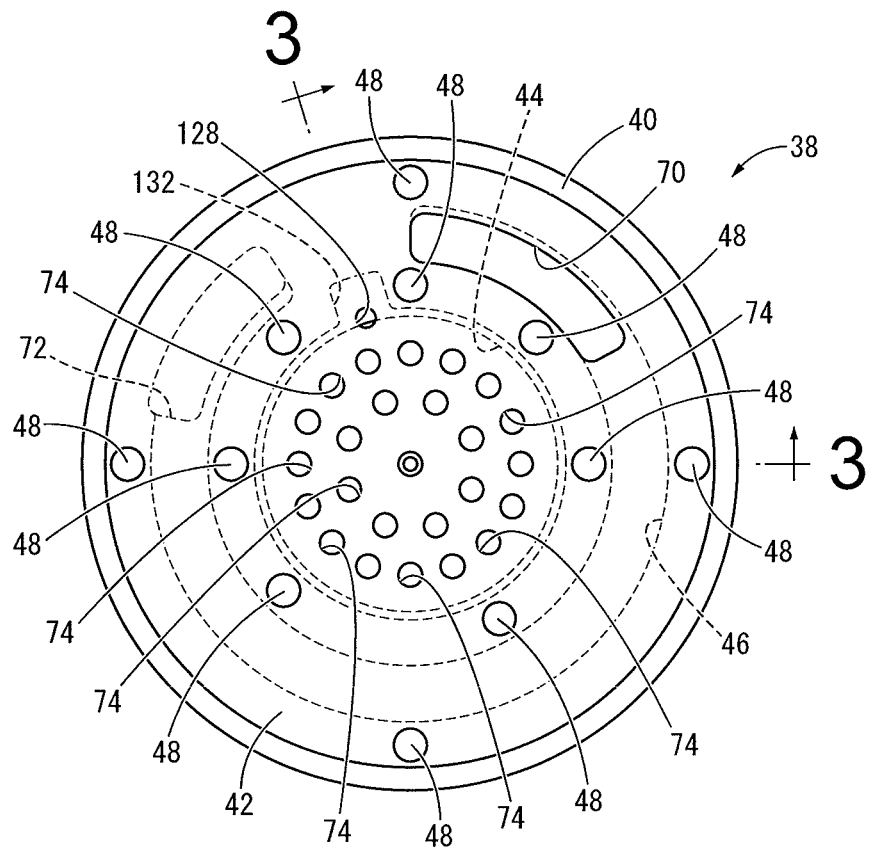
FIG. 2 is a top plane view of a partition member of the engine mount of FIG. 1.
Figure 3:
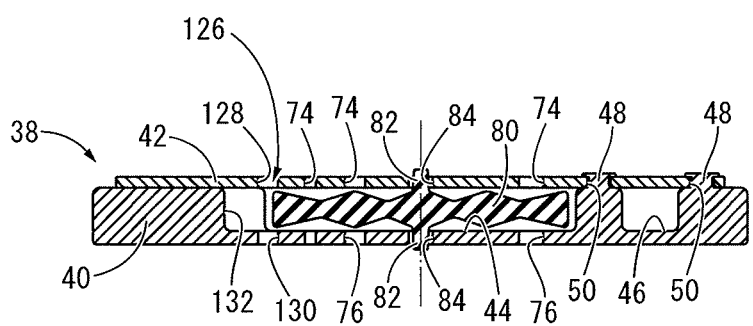
FIG. 3 is a cross sectional view taken along line 3-3 of FIG. 2.
Figure 4:
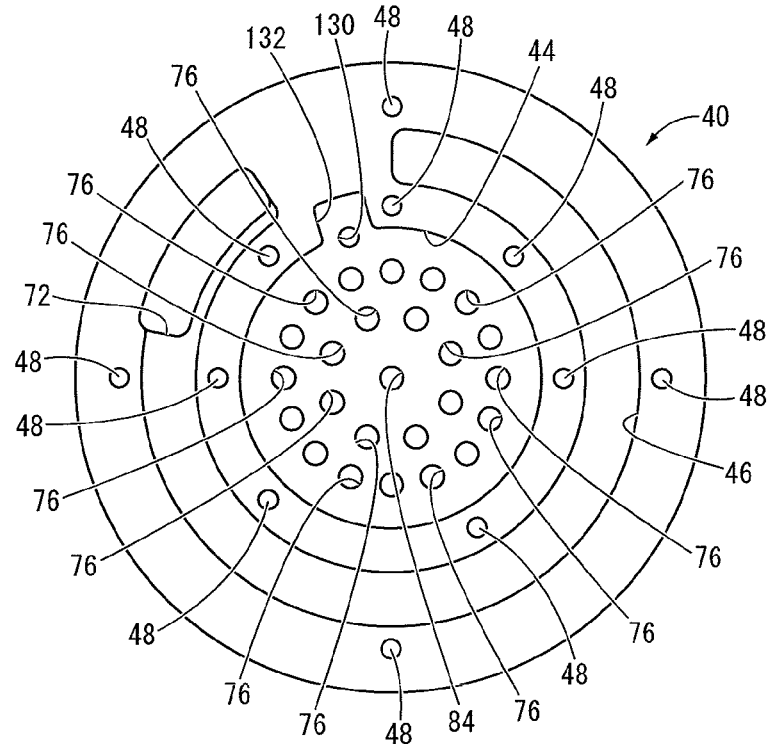
FIG. 4 is a top plane view of a partition member body of the partition member of FIG. 2.

A partition member 38 is disposed within the fluid-filled zone 36. As depicted in FIG. 2 and FIG. 3, the partition member 38 is a generally circular disk shape component and includes a partition member body 40 and a cover member 42. The partition member body 40 is of thick-walled, generally circular disk shape, and has a housing recess 44 of cylindrical shape that opens upward in its center section, as depicted in FIG. 4. A slot 46 opening upward is formed in the outside peripheral portion of the partition member body 40, and extends just short of once about the circumference.

Meanwhile, as depicted in FIG. 2 and FIG. 3, the cover member 42 has a thin-walled, circular disk shape having smaller diameter than that of the partition member body 40, and is superposed against the upper face of the partition member body 40 and secured thereto. By attaching the cover member 42 to the partition member body 40, the opening of the housing recess 44 is covered with the cover member 42 so as to form a housing space, while the opening of the slot 46 is covered with the cover member 42 so as to form a tunnel-like passage. The partition member body 40 and the cover member 42 is secured to each other in the following way: a swage projection 48 that projects upward from the partition member body 40 is inserted through a swage hole 50 passing through the cover member 42, then undergoes diameter expansion at its upper end portion, and is detained to the opening rim of the swage hole 50.

Then, the outer peripheral edge of the partition member body 40 is clasped between the axially opposed faces of the second mounting member 14 and the riser portion of the fastener fitting 32, so that the partition member 38 is supported by the second mounting member 14 and extends in the axis-perpendicular direction within the fluid-filled zone 36. In this way, the partition member 38 divides the fluid-filled zone 36 into upper and lower parts, and the upper part defines a pressure-receiving chamber 52 whose wall is partially defined by the main rubber elastic body 16.

An oscillation member 54 is disposed between the partition member 38 and the flexible film 28 axially opposed to each other. The oscillation member 54 is a metal member of small-diameter, generally cup shape or generally round tubular shape with a bottom, and is disposed on the center axis of the engine mount 10.

Besides, an annular support member 56 is disposed to the outer peripheral side of the oscillation member 54. The support member 56 is integrally equipped with an annular groove 58 that extends annularly in the circumferential direction and a support flange 60 of annular disk shape that projects outward from the upper end of the outside peripheral wall of the annular groove 58. The annular groove 58 of the support member 56 has the inside diameter dimension larger than the outside diameter dimension of the oscillation member 54. Accordingly, the inside peripheral wall of the annular groove 58 is positioned diametrically outside the peripheral wall of the oscillation member 54 so as to be spaced apart therefrom.

Moreover, a support rubber elastic body 62 is disposed between the oscillation member 54 and the support member 56. The support rubber elastic body 62 has a generally annular disk shape and become progressively thicker towards its inner peripheral side. The inner peripheral edge of the support rubber elastic body 62 is bonded by vulcanization to the peripheral wall of the oscillation member 54, while the outer peripheral edge bonded by vulcanization to the inside peripheral wall of the annular groove 58 of the support member 56. With this arrangement, the oscillation member 54 and the support member 56 are elastically connected by the support rubber elastic body 62. Note that the inner peripheral edge of the support rubber elastic body 62 is bonded to both inside and outside faces of the peripheral wall of the oscillation member 54, while the outer peripheral edge of the support rubber elastic body 62 bonded to both inside and outside faces of the inside peripheral wall of the annular groove 58. Thus, the support rubber elastic body 62 takes the form of an integrally vulcanization molded component incorporating the oscillation member 54 and the support member 56.

The integrally vulcanization molded component of the support rubber elastic body 62 constructed as above is supported by the second mounting member 14 by means of the support flange 60 of the support member 56 being clasped between the partition member body 40 and the riser portion of the fastener fitting 32 over the entire circumference. With this arrangement, the integrally vulcanization molded component of the support rubber elastic body 62 divides the lower part of the fluid-filled zone 36, which is formed between the partition member 38 and the flexible film 28 axially opposed to each other, into upper and lower parts. Accordingly, an equilibrium chamber 64 whose wall is partially defined by the flexible film 28 is formed between the flexible film 28 and the integrally vulcanization molded component of the support rubber elastic body 62. Meanwhile, an intermediate chamber 66 whose wall is partially defined by the oscillation member 54 is formed between the partition member 38 and the oscillation member 54 with the support rubber elastic body 62. Needless to say, a non-compressible fluid is sealed in all of the pressure-receiving chamber 52, the equilibrium chamber 64, and the intermediate chamber 66.

In addition, the pressure-receiving chamber 52 and the equilibrium chamber 64 are interconnected via an orifice passage 68. The orifice passage 68 is provided in the partition member 38 and includes the tunnel-like passage utilizing the slot 46 so that the pressure-receiving chamber 52 and the interior of the annular groove 58, which partially defines the equilibrium chamber 64, are held in communication. Specifically, one end of the above tunnel-like passage communicates with the pressure-receiving chamber 52 via an upper communication hole 70 formed in the cover member 42, while the other end communicates with the equilibrium chamber 64 via a lower communication hole 72 formed in the partition member body 40, thereby providing the orifice passage 68 that produces fluid flow between the pressure-receiving chamber 52 and the equilibrium chamber 64. The orifice passage 68 is tuned to low frequency on the order of 10 Hz that corresponds to an engine shake. The interior of the annular groove 58 communicates with the equilibrium chamber 64 via a plurality of passage holes 73 formed in the base wall part of the annular groove 58, thereby substantially constituting a part of the equilibrium chamber 64.

Additionally, the pressure-receiving chamber 52 and the intermediate chamber 66 are held in communication with each other through a plurality of lower through holes 76 formed in the partition member body 40, the housing recess 44, and a plurality of upper through holes 74 formed in the cover member 42. Accordingly, the upper and lower through holes 74, 76 and the housing recess 44 provide a filter orifice 78 serving as a pressure transmission passage, so that the pressure of the intermediate chamber 66 is adapted to be transmitted to the pressure-receiving chamber 52 via the filter orifice 78. The filter orifice 78 is tuned to high frequency on the order of 120 Hz that corresponds to a driving rumble or the like, namely, to higher frequency than the orifice passage 68 with respect to the liquid column resonance frequency.

Moreover, a movable rubber plate 80 serving as a movable plate is disposed within the housing recess 44. The movable rubber plate 80 is formed of a rubber elastic body of generally circular disk shape, and includes thick portions and thin portions alternately provided in the diametrical direction. Besides, the movable rubber plate 80 includes at its diametrical center a spindle portion 82 integrally formed therewith. The spindle portion 82 juts out in the axial opposite directions. The partition member body 40 and the cover member 42 each have a positioning hole 84 passing through the diametrical center thereof, and the spindle portion 82 of the movable rubber plate 80 is inserted into each of the positioning holes 84, 84. With this arrangement, the movable rubber plate 80 is disposed within the housing recess 44. In this state, the movable rubber plate 80 is positioned with respect to the partition member 38 in the diametrical direction, while being permitted tiny displacement in the axial direction.

The movable rubber plate 80 extends outwardly beyond the area where the upper and lower through holes 74, 76 are formed, and lies on the fluid path of the filter orifice 78. During input of low-frequency, large-amplitude vibration such as the engine shake, the movable rubber plate 80 is restrained by the partition member 38, and the filter orifice 78 is blocked by the movable rubber plate 80, thereby limiting the amount of fluid flow through the filter orifice 78. By so doing, pressure fluctuations of the pressure-receiving chamber 52 relative to the equilibrium chamber 64 will effectively be induced, thereby efficiently producing fluid flow through the orifice passage 68. Therefore, vibration damping effect on the basis of the flow action of the fluid will be effectively exhibited. On the other hand, during input of midrange- to high-frequency, small-amplitude vibration such as the driving rumble, owing to tiny displacement of the movable rubber plate 80, the filter orifice 78 opens and permits fluid flow. Accordingly, oscillation force of an electromagnetic actuator 94 (described later) will be transmitted to the pressure-receiving chamber 52, thereby attaining active vibration damping effect.

Note that the pressure-receiving chamber 52 and the equilibrium chamber 64 communicate with each other via the orifice passage 68 while the pressure-receiving chamber 52 and the intermediate chamber 66 communicate with each other via the filter orifice 78. On the other hand, it should be appreciated that the intermediate chamber 66 and the equilibrium chamber 64 are provided independently of each other, and there is no passage for directly interconnecting the intermediate chamber 66 and the equilibrium chamber 64.

Furthermore, the oscillation member 54 includes an output shaft 86 attached thereto. The output shaft 86 has a small-diameter rod shape extending in the vertical direction overall, and includes a swage projection integrally formed with the upper end portion of the output shaft 86. The swage projection is inserted into a swage hole passing through the base wall part of the oscillation member 54 and undergoes diameter expansion deformation, whereby the upper end portion of the output shaft 86 is secured to the base wall part of the oscillation member 54.

The output shaft 86 includes an anchor flange 92 of annular disk shape that is integrally formed to the axially medial section of the output shaft 86 and projects diametrically outward. The anchor flange 92 is bonded by vulcanization to the center section of the flexible film 28. With this arrangement, the output shaft 86 penetrates the flexible film 28 in the vertical direction and is fluid-tightly anchored to the flexible film 28, so that fluidtightness of the fluid-filled zone 36 is ensured.

Meanwhile, the lower end portion of the output shaft 86 is attached to the electromagnetic actuator 94. The electromagnetic actuator 94 includes a stator 96 furnished with a coil 100, and a movable member 98 capable of oscillating displacement in the vertical direction with respect to the stator 96.

The stator 96 has a structure in which a yoke member 102 is attached around the coil 100 of cylindrical shape. The yoke member 102 is formed of a ferromagnet and constructed by combining: an outside peripheral yoke member 104 of round tubular shape with a bottom that has a circular passage hole in the center of its base wall; an inside peripheral yoke member 106 of generally annular shape that is fitted into the passage hole of the outside peripheral yoke member 104; and an upper yoke member 108 of generally annular disk shape that is attached to the upper opening of the outside peripheral yoke member 104. There are formed magnetic gaps between the inner peripheral upper end of the inside peripheral yoke member 106 and the inner peripheral lower end of the upper yoke member 108 which are separated from each other, so that the inner peripheral edges of the yoke members 106, 108 serve as magnetic pole portions 110, 112 that provide a magnetic pole through energization of the coil 100. Note that an insulating component 114 formed of an electrically insulative synthetic resin material is provided between the coil 100 and the yoke member 102, so that the periphery of the coil 100 is covered by the insulating component 114.

The movable member 98 is disposed in the center section of the stator 96. The movable member 98 is a component formed of a ferromagnet and having a generally cylindrical shape. An inner flanged portion 116 is integrally formed with the upper end portion of the movable member 98 and projects inward. The movable member 98 is inserted into the center hole of the upper yoke member 108 while being in opposition to the inner peripheral edge of the inside peripheral yoke member 106 in the axial direction. When the coil 100 is energized and a magnetic pole is provided to the inner peripheral edge of the inside peripheral yoke member 106 (the magnetic pole portion 110), attractive force toward the inside peripheral yoke member 106 will be exerted on the movable member 98. Accordingly, the movable member 98 undergoes displacement axially downward.

The electromagnetic actuator 94 constructed in the above manner is attached to the second mounting member 14. Specifically, the upper yoke member 108 of the electromagnetic actuator 94 and the lower end portion of the fastener fitting 32 are secured by means of a diameter-constricting caulking or the like. By so doing, the stator 96 of the electromagnetic actuator 94 is supported by the second mounting member 14 via the fastener fitting 32.

Meanwhile, the movable member 98 of the electromagnetic actuator 94 is attached to the output shaft 86. Specifically, the portion of the output shaft 86 that extends downward from the flexible film 28 is inserted into the center hole of the movable member 98, and a coil spring 118 is interposed between the anchor flange 92 and the upper face of the movable member 98. Meanwhile, a detent nut 120 is threaded onto a bolt thread portion provided to the lower end portion of the output shaft 86 and comes into contact with the inner flanged portion 116 of the movable member 98 from below. By so doing, the output shaft 86 and the movable member 98 are elastically positioned and interconnected. As will be apparent from the above description, relative displacement between the upper end portion of the output shaft 86 and the movable member 98 in the direction of axial separation is limited by the detent nut 120, while relative displacement therebetween in the direction of axial approach is permitted by deformation of the coil spring 118.

When the coil 100 of the electromagnetic actuator 94 is energized by the power supply 122 outside and axially downward force is exerted on the movable member 98, the output shaft 86 connected to the movable member 98 undergoes displacement downward, so that the oscillation member 54 fastened to the upper end of the output shaft 86 undergoes displacement downward. Then, when energization of the coil 100 by the power supply 122 is ceased, the support rubber elastic body 62, which has been subjected to elastic deformation due to displacement of the oscillation member 54, will exhibit recovery force based on its elasticity, whereby the oscillation member 54, and the output shaft 86 and the movable member 98 connected to the oscillation member 54 will be restored to their original position. Therefore, by controlling energization of the coil 100 by the power supply 122 by utilizing a control means 124, the oscillation member 54 is oscillated in the vertical direction by the electromagnetic actuator 94, thereby applying a prescribed oscillation force to the intermediate chamber 66.

While no particular limitation is imposed as to controlling of the energization of the coil 100 by the control means 124, it can be realized through, for example, so-called map control, which measures the input vibration in advance, and controls so as to exhibit effective vibration damping action against the input vibration expected from the measurement results. Of course, it would also be possible to employ feedback control or the like, which detects the input vibration by a sensor, and controls the oscillation force based on the detect results.

Figure 5:
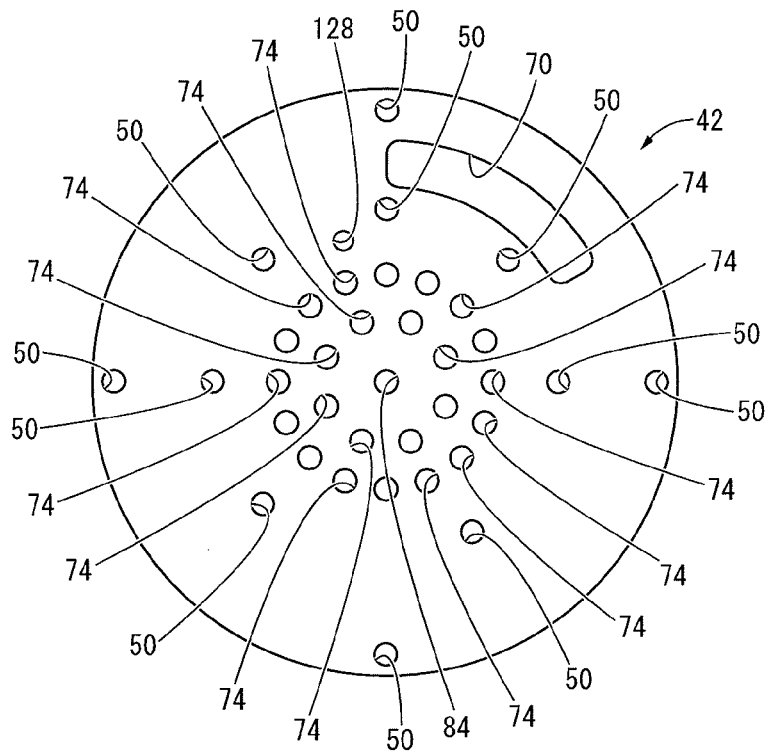
FIG. 5 is a top plane view of a cover member of the partition member of FIG. 2.

Here, the engine mount 10 according to the present embodiment includes a leak hole 126 for interconnecting the pressure-receiving chamber 52 and the intermediate chamber 66 in order to effectively obtain active vibration damping effect by utilizing the oscillation force of the electromagnetic actuator 94. As depicted in FIG. 3, the leak hole 126 perforates the partition member 38 in the vertical direction. Besides, as depicted in FIG. 1, the leak hole 126 continuously interconnects the pressure-receiving chamber 52 and the intermediate chamber 66 at a position away from the movable rubber plate 80 to the outer peripheral side. More specifically, the leak hole 126 includes the housing recess 44. The housing recess 44 communicates with the pressure-receiving chamber 52 via an upper hole 128 (see FIG. 5) that perforates the cover member 42, while communicating with the intermediate chamber 66 via a lower hole 130 (see FIG. 4) that perforates the partition member body 40, thereby forming the leak hole 126. Note that providing the leak hole 126 at a position away from the movable rubber plate 80 to the outer peripheral side does not necessarily or definitely refer to providing the leak hole 126 so as not to overlap the movable rubber plate 80 over its entirety. It will be suffice to provide the leak hole 126 so that the fluid flow through the leak hole 126 should not be completely blocked by the movable rubber plate 80.

Besides, the liquid column resonance frequency (f) of the leak hole 126 is set to a lower frequency than the liquid column resonance frequency (f') of the filter orifice 78, namely, to not more than half of the liquid column resonance frequency of the filter orifice 78 (f≤f'/2). Preferably, the liquid column resonance frequency (f) of the leak hole 126 is set to at least 1/10 but not more than 2/5 of the liquid column resonance frequency (f') of the filter orifice 78 (f'/10≤f≤2f'/5), and more preferably, to at least 1/8 but not more than 1/4 (f'/8≤f≤f'/4). In the present embodiment, the liquid column resonance frequency (f) of the leak hole 126 is set to around 1/6 of the liquid column resonance frequency (f') of the filter orifice 78. The liquid column resonance frequency of each of the orifice passage 68, the filter orifice 78, and the leak hole 126 is set by adjusting the ratio (A/L) of cross-sectional area (A) and the length (L) thereof in consideration of the wall spring rigidities of the pressure-receiving chamber 52, the equilibrium chamber 64, and the intermediate chamber 66.

Additionally, the housing recess 44 is partially expanded in diameter in a circumferential part where the upper hole 128 and the lower hole 130 are formed. A middle communication portion 132 is defined by the expanded part of the housing recess 44. The upper hole 128 and the lower hole 130 continuously communicate with each other via the middle communication portion 132. Thus, through the upper hole 128, the lower hole 130, and the middle communication portion 132, the leak hole 126 continuously keeps open state regardless of displacement of the movable rubber plate 80 or the like.

With the engine mount 10 of construction according to the present embodiment, when relative pressure differential arises between the pressure-receiving chamber 52 and the intermediate chamber 66 and the movable rubber plate 80 blocks the filter orifice 78, the pressure-receiving chamber 52 and the intermediate chamber 66 are kept interconnected via the leak hole 126. Therefore, fluid flow through the leak hole 126 will ameliorate or dispel the relative pressure differential between the pressure-receiving chamber 52 and the intermediate chamber 66, so that the filter orifice 78 sealed off by the movable rubber plate 80 will be released. Accordingly, during input of low-frequency vibration that corresponds to engine shake, the filter orifice 78 is blocked by the movable rubber plate 80, so that vibration damping effect based on flow behavior of the fluid through the orifice passage 68 will be exhibited. Meanwhile, during input of midrange- to high-frequency vibration that corresponds to idling vibration, driving rumble or the like, the filter orifice 78 opens, so that active vibration damping effect will be achieved based on the oscillation force exerted on the oscillation member 54 from the electromagnetic actuator 94. In this way, owing to the leak hole 126, the engine mount 10 is able to effectively obtain both the passive vibration damping effect by means of the orifice passage 68 and the active vibration damping effect by means of the electromagnetic actuator 94, even without forming a passage that interconnects the intermediate chamber 66 and the equilibrium chamber 64.

In particular, with the engine mount 10 that includes the electromagnetic actuator 94, relative position between the movable member 98 and the stator 96 has a significant influence with respect to generative force. Thus, it is desirable that deviation of the relative position between the movable member 98 and the stator 96 be a minimum. In this regard, owing to the leak hole 126, even in the case where the filter orifice 78 is blocked with the pressure within the intermediate chamber 66 increased or decreased, fluid flow through the leak hole 126 will dispel the increased pressure or decreased pressure within the intermediate chamber 66. Therefore, it is possible to avoid the situation in which the fluid pressure within the intermediate chamber 66 acts on the oscillation member 54 and causes deviation of the movable member 98 relative to the stator 96 in the axial direction. As a result, the electromagnetic actuator 94 is able to obtain generative force efficiently, whereby desired active vibration damping effect will effectively be exhibited.

In addition, the liquid column resonance frequency of the leak hole 126 is set to not more than half of that of the filter orifice 78. With this arrangement, during input of low-frequency vibration, the amount of fluid flow through the leak hole 126 is limited, so that pressure fluctuations within the pressure-receiving chamber 52 will be inhibited from escaping to the intermediate chamber 66. As a result, relative pressure differential between the pressure-receiving chamber 52 and the equilibrium chamber 64 becomes greater, thereby producing ample fluid flow between the pressure-receiving chamber 52 and the equilibrium chamber 64 through the orifice passage 68. Thus, vibration damping effect will effectively be achieved on the basis of the flow action of the fluid.

Moreover, in the present embodiment, the liquid column resonance frequency of the leak hole 126 is set to at least 1/10 but not more than 2/5 of that of the filter orifice 78. Accordingly, during input of low-frequency vibration, ample fluid flow through the orifice passage 68 will more efficiently be produced, thereby advantageously attaining vibration damping effect on the basis of the flow action of the fluid. Besides, the leak hole 126 can be easily created with a simple shape without increasing the size of the partition member 38. That is, the liquid column resonance frequency may be set to sufficiently low frequency in comparison with that of orifice passage 68, from the viewpoint of effectively obtaining vibration damping effect by means of the orifice passage 68. However, in order to set the liquid column resonance frequency of the leak hole 126 to low frequency, it should be necessary to make its cross-sectional area small or to make its length large. Consequently, excessively small diameter of the leak hole 126 may cause difficulty in its creation, while large length of the leak hole 126 may require increase in size of the partition member 38. At this point, since the liquid column resonance frequency of the leak hole 126 is set to at least 1/10 of that of the filter orifice 78, which is created in the same partition member 38, the leak hole 126 can be easily created without increasing the size of the partition member 38.

The engine mount 10 is preferably employed when the electromagnetic actuator 94 is controlled through map control by the control means 124. This is because the intermediate chamber 66 and the equilibrium chamber 64 are provided independently of each other without any passage (namely, an idle orifice) for interconnecting the intermediate chamber 66 and the equilibrium chamber 64, and sharp change in spring constant is less likely to become a problem. Thus, it is possible to effectively obtain active vibration damping effect even through the map control.

Furthermore, the leak hole 126 is provided in the rigid partition member 38 and interconnects the pressure-receiving chamber 52 and the intermediate chamber 66. Accordingly, deformation of the leak hole 126 due to fluid pressure acting thereon can be avoided. Besides, the leak hole 126 can always be created with the identical shape with high accuracy.

Figure 6A:
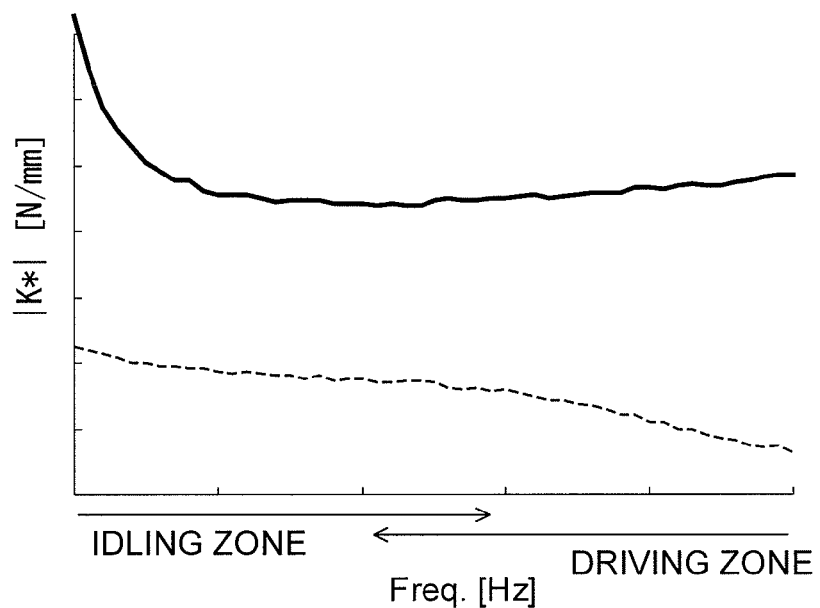
FIGS. 6A and 6B are graphs each demonstrating a correlation between frequencies and spring constants.
Figure 6B:
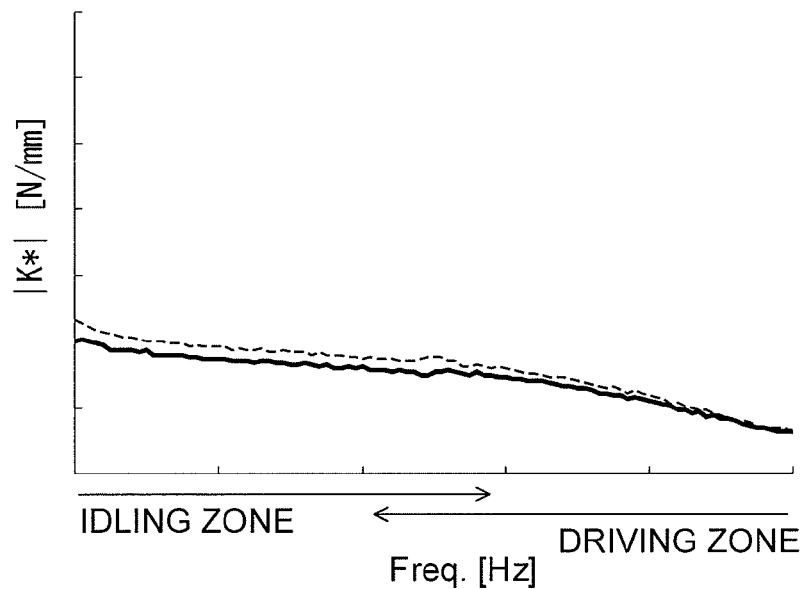

The above-described effect of the present invention is demonstrated by actual measurements shown in FIGS. 6A and 6B. Specifically, FIG. 6A shows the actual measurements of the relationship between frequencies of input vibration and spring constants in the axial direction of an engine mount (Comparative Example) having construction in which the leak hole 126 is omitted from the engine mount 10 according to the above-described embodiment. According to this graph, as compared to the spring constants (indicated by the dashed line) which are measured when only a small-amplitude vibration is input, the spring constants (indicated by the solid line) which are measured when a small-amplitude vibration is input after a large-amplitude vibration is input are considerably greater. This is attributed to the intermediate chamber 66 being sealed off by the movable rubber plate 80 blocking the filter orifice 78 during input of the large-amplitude vibration. The vibration damping ability is apparently deteriorated.

On the other hand, FIG. 6B shows the actual measurements of the relationship between frequencies of input vibration and spring constants in the axial direction of the engine mount 10 (Example) constructed according to the above-described embodiment. According to this graph, the spring constants (indicated by the dashed line) which are measured when only a small-amplitude vibration is input and the spring constants (indicated by the solid line) which are measured when a small-amplitude vibration is input after a large-amplitude vibration is input are substantially identical to each other. This is attributed to the movable rubber plate 80, which has blocked the filter orifice 78 during input of the large-amplitude vibration, rapidly releasing the filter orifice 78 in association with fluid pressure fluctuation within the intermediate chamber 66 owing to fluid flow through the leak hole 126. The desired vibration damping ability is sufficiently obtained thereby.

As will be apparent from the actual measurements described above, owing to the leak hole 126 which interconnects the pressure-receiving chamber 52 and the intermediate chamber 66, even if the intermediate chamber 66 and the equilibrium chamber 64 are provided independently of each other, effective vibration damping effect will be exhibited.

While the present invention has been described in detail hereinabove in terms of the preferred embodiment, the invention is not limited by the specific disclosures thereof. For example, in the preceding embodiment, the upper hole 128 and the lower hole 130 of the leak hole 126 partially overlap the movable rubber plate 80. However, the leak hole may be provided at a position completely away from the movable plate to the outer peripheral side. On the other hand, as long as the fluid path of the leak hole is ensured so as not to be blocked by displacement or deformation of the movable plate, the entire leak hole may overlap the movable plate when viewed in axial direction projection. That is, providing the leak hole at a position away from the movable plate refers to continuously keeping the fluid path of the leak hole open without being blocked by the movable plate.

Besides, the leak hole is not necessarily defined by a single hole, but may alternatively be defined by several holes.

Moreover, whereas it is desirable that the leak hole perforate the partition member 38 in the in the vertical direction, the leak hole may alternatively be provided so as to extend in the circumferential direction or in the diametrical direction with the aim of obtaining its sufficient length or the like. In addition, it will suffice for the liquid column resonance frequency of the leak hole to be not more than half of that of the filter orifice. Therefore, in the case where the length of the leak hole is sufficiently obtained or the like, as discussed earlier, the liquid column resonance frequency of the leak hole could be set to lower frequency than 1/10 of that of the filter orifice.

Furthermore, the present invention is not necessarily limited to implementation in an automotive engine mount, and may be implemented for example in an automotive sub-frame mounts, body mounts, differential mounts or the like. Also, the present invention is applicable to any of vibration damping devices for non-automotive various vibrating bodies such as motorized two wheeled vehicles, rail vehicles, industrial vehicles, or the like.

What is claimed is:

1. A fluid-filled type active vibration damping device comprising:
   a first mounting member;
   a second mounting member;
   a main rubber elastic body connecting the first mounting member and the second mounting member;
   a pressure-receiving chamber whose wall is partially defined by the main rubber elastic body and filled with a non-compressible fluid;
   an equilibrium chamber whose wall is partially defined by a flexible film and filled with the non-compressible fluid;
   an orifice passage permitting fluid flow of the non-compressible fluid between the pressure-receiving chamber and the equilibrium chamber;
   an oscillation member adapted to be oscillated by an electromagnetic actuator;
   an intermediate chamber whose wall is partially defined by the oscillation member and filled with the non-compressible fluid;
   a pressure transmission passage through which pressure fluctuations produced in the intermediate chamber is adapted to be applied to the pressure-receiving chamber,
   wherein the intermediate chamber is provided independently of the equilibrium chamber such that there is no connecting passage that directly interconnects the intermediate chamber and the equilibrium chamber;
   wherein the pressure transmission passage comprises a filter orifice tuned to higher frequency than the orifice passage;
   wherein a movable plate is provided for limiting an amount of fluid flow through the filter orifice;
   wherein a leak hole is formed for continuously interconnecting the intermediate chamber and the pressure-receiving chamber, and a liquid column resonance frequency of the leak hole is set to not more than half of that of the filter orifice;
   wherein the leak hole provides continuous uninterrupted communication between the intermediate chamber and the pressure-receiving chamber, and the leak hole being configured to release a blocking of the filter orifice by the movable plate by dispelling a differential in fluid pressure between the pressure-receiving chamber and the intermediate chamber; and
   further comprises a housing recess defined by a partition member body and a cover member, the movable plate being enclosed within the housing recess, and the leak hole being defined by an upper hole penetrating to the cover member while being located radially outside of a rim of the movable plate, a lower hole penetrating the partition member body while being located radially outside of the rim of the movable plate, and a middle communication portion that is defined by a portion of the housing recess partially expanded in diameter in a circumferential part where the upper hole and the lower hole are formed so that the upper hole and the lower hole continuously communicate with each other via the middle communication portion, and
   the middle communication portion is further defined as a slot that opens upward, wherein the slot is formed in an outside peripheral portion of the partition member body, and the slot extends radially from a circumference of the partition member body.

2. The fluid-filled type active vibration damping device according to claim 1, wherein the liquid column resonance frequency of the leak hole is set to at least $1/10$ but not more than $2/5$ of that of the filter orifice.

3. The fluid filled type active vibration damping device according to claim 1, a center portion of the movable plate is supported and a peripheral portion of the movable plate is freely provided within the housing recess.

4. The fluid filled type active vibration damping device according to claim 1, the leak hole being positioned in the vicinity of an outer peripheral portion of the movable plate.

5. The fluid filled type active vibration damping device according to claim 1, the leak hole being configured such that a flow of the non-compressible fluid through the leak hole is not fully blocked by the movable plate.

6. The fluid filled type active vibration damping device according to claim 1, the movable plate is supported at a central portion and a peripheral portion of the movable plate is movable in a direction transverse to the longitudinal extent of the movable plate.

7. The fluid filled type active vibration damping device according to claim 1, the electromagnetic actuator being coupled to the oscillation member at a location spaced from the movable plate.

8. The fluid filled type active vibration damping device according to claim 3, the movable plate comprising an axially extending spindle portion, the cover member and the partition member body each having a central positioning hole, oppositely extending ends of the spindle portion extending into the positioning holes of the cover member and the partition member body.

9. The fluid filled type active vibration damping device according to claim 1, the filter orifice comprising a first plurality of holes extending through the cover member, a second plurality of holes extending through the partition member body and a portion of the housing recess, the first plurality of holes and the second plurality of holes being positioned inwardly of a peripheral portion of the movable plate.

10. The fluid filled type active vibration damping device according to claim 1, the pressure receiving chamber and the equilibrium chamber communicate with each other through the orifice passage and the pressure receiving chamber and the intermediate chamber communicate with each other through the filter orifice.

11. The fluid filled type active vibration damping device according to claim 1, both a fluid path through the leak hole and a fluid path through the filter orifice include a portion of the housing recess that receives the movable plate.

* * * * *